Aug. 26, 1952　　　L. C. KELSEY　　　2,608,128
PHOTOTUBE AMPLIFICATION
Filed March 9, 1949
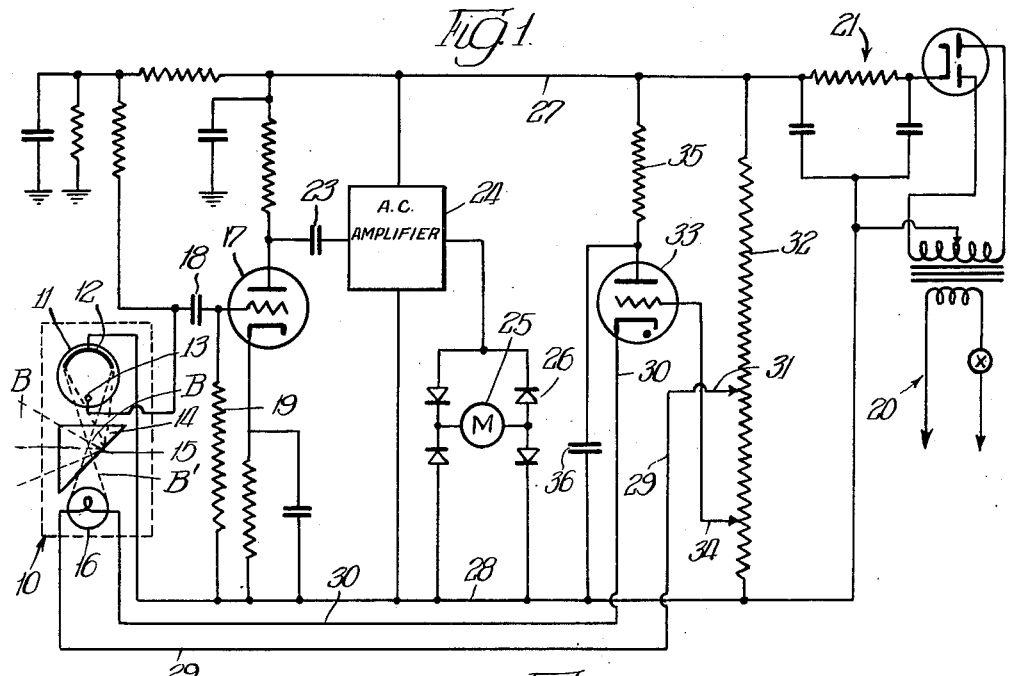
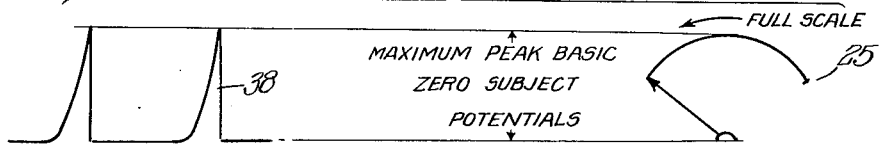
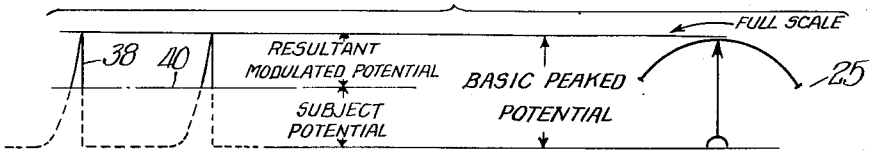
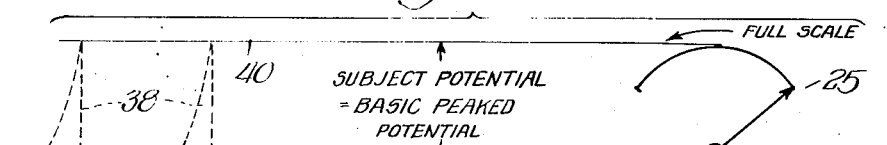
INVENTOR.
Lawrence C. Kelsey,
BY
Cromwell, Greist & Warden
Attys.

Patented Aug. 26, 1952

2,608,128

UNITED STATES PATENT OFFICE 2,608,128

PHOTOTUBE AMPLIFICATION

Lawrence C. Kelsey, Chicago, Ill., assignor to W. M. Welsh Manufacturing Company, Chicago, Ill., a corporation of Illinois Application March 9, 1949, Serial No. 80,453

2 Claims. (Cl. 88—23)

The present invention pertains to an improved system and method of amplifying and measuring small phototube potentials or like small steady linear currents. More particularly, the invention concerns such a system and method, in which the unidirectional photoelectric current is modulated to exhibit an undulatory or alternating wave form for the purpose of adapting the same for amplification by means of an alternating current amplifier.

It is a general object of the present invention to provide an improved circuit for and method of measuring extremely small photoelectrically derived currents by light-modulating the output of a photosensitive device at predetermined frequency, without the use of special external lighting equipment unrelated to the measuring circuit, in which an independent modulator source of light or radiant energy wired in said circuit is intermittently actuated and is made effective on said photosensitive device in conjunction with light or radiant energy from a subject source of manifestation under observation, the resultant undulatory modulated output of said device being built up by an alternating current amplifier and, so amplified being measured to, accurately indicate the value of the radiant energy manifestation in question with relation to an absolute standard.

More specifically, its is an object of the invention to provide a phototube amplification circuit or system of the sort referred to in the preceding paragraph, characterized by an intermittently energized radiant modulator source positioned for impingement of its rays on an associated phototube conjointly with impingement on the latter of certain subject external light rays or other external radiant energy manifestation or source which is to be measured, which rays are quite independent of the system, being substantially unvarying in intensity, said modulator source being effective to cause said phototube to originate a sharply peaked, saw-tooth type basic voltage, representing (in the illustrated embodiment) the maximum signal voltage that the A. C. amplifier of the system will be called upon to amplify at any time, the radiant energy of the subject source being likewise photoelectrically converted by said phototube and applied to the amplifier with the effect of modifying (preferably by diminishing) the peak values of said basic voltage on which it is superimposed, said system also incorporating a suitable meter to receive the amplified modulated voltage and to make an appropriate indication of the intensity of the subject rays within a predetermined absolute range adapted to be measured by the system.

The foregoing statements are indicative in a general way of the nature of the invention, but other and more specific objects will be apparent to those skilled in the art upon a full understanding of the construction and operation of the device.

Various methods and circuits have heretofore been proposed for the purpose of building up extremely small, photoelectrically derived voltages to values which lend themselves to being analyzed, compared or applied in the performance of useful work by existing types of instruments or apparatus. Being of a linear, steady character, though variable in value, the photoelectric potential could of course be amplified by existing types of direct current amplifiers; however, as a practical matter, the D. C. amplifier is inherently unsuited for this type of work for certain reasons not necessary to be detailed here. It suffices to say that it is preferable to build up the photoelectric potential to a useable value by means of an alternating current amplifier, of which various types are available.

To the above end, it has been proposed to convert the steady photoelectric voltages to alternating or undulatory wave form by various methods. Certain mechanical arrangements have been suggested for the purpose of intermittently interrupting the impingement of a subject beam of light on a photosensitive element which is adapted to convert the light energy to electrical energy, in order to produce an undulatory wave output characteristic. Likewise, various systems have been proposed for modulating the photoelectric current by subjecting the flow of electrons in a photosensitive element to an intermittent magnetic field, for the purpose of deflecting the electron stream and thus modifying or interrupting the output of said photosensitive element. Modulation of phototube output by an intermittently applied electric potential is another proposed method.

My Patent No. 2,499,996, dated March 7, 1950, illustrates and describes an approach to the problem of converting the steady photoelectric voltage to an alternating, intermittent character by utilizing still another principle. This involves the "light-modulation" of the voltage originating in a phototube by means of an intermittently energized modulator light source to which said tube is exposed, in addition to the subject light source or manifestation which is being studied, measured or put to work. In accordance with that patent, the light-modulating action exerted on the phototube is made available at a pre-amplifier stage of the A. C. amplifier circuit in a fashion to intermittently blank out the photoelectric current flowing through said circuit, whereby to impart the desired alternating characteristic to said current.

The present invention is also based on the principle of light-modulation of the photoelectric current, although applied in a materially different manner than in the patent referred to. Briefly, the present measuring system and method rely on the use of a modulator light source to set up in the phototube a basic modulated or sawtooth type voltage which is peaked at predetermined intervals of predetermined frequency at a uniform maximum value. This basic current is fed to an alternating current amplifier in which it has subtractively superimposed thereon the variable linear voltage under study, set up in said phototube by the subject in question. It is the density, light reflectively or light transmissivity of this subject which it is desired to measure or study. The arrangement, in the illustrated embodiment, is such that photoelectrically derived, linear potential acts in opposition to the basic potential to produce a resultant alternating wave form which is modulated by the variable values of the potential that are attributable to light responsive quality of the subject. This resultant wave is amplified by an A. C. amplifier and fed to a suitable device adapted to measure, compare, analyze or apply as a useful working force the photoelectric potential in question.

Concerning the two potentials originating in the phototube, that derived from the intermittently operated modulator light source will be referred to as the basic potential, and the linear voltage derived from the external source or manifestation in question will be identified as the subject potential. Although it is preferable that these potentials be employed subtractively, as in the illustrated embodiment of the invention, i. e., in opposition to one another, for certain reasons which will appear, it is evident that they may also be combined additively and fed to the A. C. amplifier. The result is substantially the same in either case.

A single embodiment of the invention is presented herein for purpose of exemplification, but it will be appreciated that the invention is susceptible of incorporation in other modified forms coming equally within the scope of the appended claims.

In the drawings,

Fig. 1 is a schematic view illustrating a wiring diagram and associated parts of the present phototube amplification and measuring system; and Figs. 2, 3 and 4 graphically and diagrammatically represent the manner in which the electrical potentials involved in the operation of the system are correlated and applied, for example, in a meter reading of the intensity, character, etc. of an external subject.

Referring to Fig. 1 of the drawings, the reference numeral 10 generally designates a suitable housing enclosing a well known type of photoelectric tube 11 characterized by a cathode 12 which, when impinged by rays of light, initiates a flow of electrons between said cathode and the anode 13 of the tube. A prism 14 is positioned in housing 10 for impingement by light rays, illustrated as the beam B, emanating from an external source of light or other radiant energy manifestation which is to be measured. Such light is admitted to the housing 10 through a small aperture therein (not shown) and is reflected from an internal reflecting surface 15 of prism 14 onto phototube cathode 12.

Although reference has been made to a specific beam B, it is to be understood that the accurate measuring function performed by the circuit or system imposes the requirement that the beam or rays in question be of a substantially unvarying intensity, such as emanated by light transmission, or reflection from a subject whose light responsive characteristics, such as density, color, etc., are to be measured. The method of the invention is performed without the use of special external light generative means which are independent of the circuit involved in the performance of the method. In other words, the system is particularly devised and adapted for laboratory measuring apparatus or like equipment employed in light analysis or measurement of the qualities of various different classes of objects.

A small lamp or other radiant energy source 16 is also mounted within the housing 10, being positioned with relation to prism 14 and phototube 11 so that the light emanated thereby also strikes the phototube cathode. This lamp is illustrated for simplicity as being a filament type, though other sorts of electrically energizable source may be substituted therefor. Source 16 serves as a modulator which is energized by the provisions to be described to originate intermittent, very bright light beams or pulses of very short duration and of predetermined frequency. It thus sets up, through the agency of phototube 11, a sharply peaked, pulsating or alternatingly modulated basic voltage, on which is superimposed the linear, unidirectional subject voltage originated by said phototube 11 in response to its impingement by the external subject beam B. For convenience, the modulator beam originating in source 16 is designated B'. Light emanating from beam B' is at all times more intense than that from the subject beam B.

The phototube 11 has its anode 13 connected to the grid of a pre-amplifier thermionic triode 17 through a capacitor 18. The phototube cathode 12 is connected to the low potential side of the power line, with a resistor 19 interposed between said cathode and said grid.

The circuit is suitably supplied with electrical power, as from a standard 110 volt alternating line, designated generally by the reference numeral 20, connected to a rectifier unit, generally designated 21. These provisions are entirely conventional in nature. Pre-amplifier tube 17 obtains its voltage supply from the power source 20, 21 in a more or less conventional manner, not deemed necessary to further describe.

The plate of tube 17 is connected through a capacitor 23 with the input side of an alternating current amplifier 24, which is of a type well known in the art. The output of amplifier 24 is fed to a conventional D. C. meter 25 (in the particular installation of the system chosen for the purpose of illustration), said meter being equipped with a bridge type rectifier 26. The amplifier 24 is supplied with operating potential by its connections to the opposite leads 27, 28 of the power supply means 20, 21, and the meter rectifier circuit is also connected to the line 28.

The modulator-light source 16 is electrically energized through the leads 29, 30 connected to its filament, and it will be understood that any of the various other types of radiant energy emitting elements which may be employed in substitution for the illustrated lamp 16 will be similarly energized. The lead 29 is connected to an adjustable contact 31 of a potentiometer 32 disposed across power leads 27, 28.

Said potentiometer also serves as a source of control or operating voltage for a gaseous discharge tube 33 of the "thyratron" type which has its control grid connected to an adjustable contact 34 of the potentiometer 32.

The lead 30 of light source 16 is connected to the cathode of the discharge tube 33, which otherwise derives its operating potential in a conventional fashion through a resistor 35 connecting its plate to the plus power supply line 27 and a capacitor 36 connected between its plate and the minus power supply line 28.

Operation of the present system and method is founded on the correlation or combination of the values of the respective photoelectrically derived, subject and basic potentials which are produced by impingement on phototube 11 of the respective beams B, B', and in the employment of the resultant peaked or alternating voltage, which reflects the density reflectivity or other light responsive quality of the subject. In applying this principle, these voltages are superimposed on one another. The intermittently recurrent beam B' produces a sharply peaked, sawtooth type current whose original wave form is designated in Fig. 2 by the reference numeral 38. In the event that zero light impinges phototube 11 from the external subject under consideration, represented by beam B, which is the condition producing the wave form of Fig. 2 and the corresponding meter indication to the right of that figure, said wave form exhibits a maximum amplitude of uniform value at the successive peaks thereof. Since this is a condition of zero light impingement from the subject under consideration, it is desirable that the meter 25 be so calibrated or so connected that this maximum, full scale indication by the meter will represent a zero reading.

In the event an external beam B of intermediate value impinges prism 14 and is reflected thereby to energize phototube 11, a condition which is represented in Fig. 3, the value of said linear voltage, at any instant, is represented by the intermediate line 40. This amounts to raising the effective zero level or base line with regard to which the value of the peak maxima of wave 38 are determined, hence, the resultant amplitude of said peaks is in inverse ratio to the value of the subject potential, at any instant. In other words, the effective amplitude of the sawtooth wave 38 is diminished in proportion to the magnitude or intensity of the external, subject light manifestation. A corresponding, intermediate reading of the meter results, as shown in Fig. 3.

In the situation represented by Fig. 4, the external subject light is at a maximum, and can be considered equivalent in its effect on the phototube 11 to that of the modulator lamp 16. Hence, it in effect cancels the voltage derived from said modulator lamp and meter 25 receives a signal which is reflected by a zero swing of its needle. A calibration of the meter scale in the manner suggested above will represent this as a maximum reading of the quality of the subject under consideration.

A subtractive superimposition of the maximum basic potential originated by the modulator 16 and the subject light originating at the object whose light responsive characteristic is to be measured is employed in accordance with the present invention. The instantaneous potential resulting from the latter is compared with the maximum peaked potential resulting from the former, raising the base from which the actual value of that maximum is ascertained. In a system according to the invention in which the superimposition of potentials is additive, as distinguished from subtractive, the maximum gain characteristics of the amplifiers will limit the faithfulness of reproduction of signals at the meter 25 due to cutoff saturation. However, with an amplifier tube of given gain, the subtractive principle gives the assurance that the signal which is fed to the amplifier tube grid will not exceed the maximum reference voltage. If it does, a zero reading results and the simple expedient of shifting meter resistance to afford a different range places the system in 100% accurate measuring responsivity.

In the illustrated embodiment, the electrical pulses for exciting the modulator lamp 16 are generated in the gaseous discharge tube 33 at a rate or frequency which is determined by the values of the resistor 35 and capacitor 36. This constitutes a very satisfactory and reliable, as well as inexpensive, power supply for the lamp 16. However, it will be appreciated that other forms of intermittent power generating or transmitting devices may be employed in substitution for the tube 33.

I am aware that those skilled in the art will appreciate the possibility of making various alterations shown above, as well as the various adaptations of the latter. Such alternative structures or relationships or adaptations are regarded as being within the scope of the present invention, which should be construed no more limitedly as is reasonably indicated by the scope of the appended claims.

I claim:

1. A system for amplifying photoelectric currents comprising a photosensitive tube adapted to be exposed to a radiant energy manifestation whereby to generate a substantially linear potential output, a modulator source of radiant energy positioned to direct rays on said tube, means intermittently energizing said modulator source at predetermined frequency to produce a maximum basic potential output having an alternating, peaked wave characteristic and of value greater than said linear potential output, and common means connected to said photosensitive tube to utilize the differential potential, of lesser value than said maximum basic potential output, which results from the subtractive superimposition of said linear and peaked potentials, said means including an amplifier tube and a capacitative coupling between said photosensitive and amplifier tubes, said photosensitive tube having an electrode electrically connected to a first electrode of said amplifier tube and to the junction of said coupling with a second electrode of the amplifier tube.

2. A system for measuring small photoelectric current, comprising a photosensitive tube adapted to be exposed to light emanating from a subject in substantially unvarying intensity, whereby to generate a substantially linear potential output, a modulator source of radiant energy positioned to direct rays on said tube, means to intermittently energize said modulator source at predetermined frequency to produce a potential output having an alternating, peaked wave characteristic, an amplifier tube, a capacitative coupling connecting an electrode of said tube with an electrode of said photosensitive tube, said electrode of said photosensitive tube also being connected to the junction of said coupling and amplifier tube electrode and to a further electrode of said amplifier tube, whereby to amplify the potential resulting from the subtractive superimposition of said linear and peaked potentials, and means connected to said amplifier tube to measure said amplified resultant potential.

LAWRENCE C. KELSEY.

REFERENCES CITED

The following references are of record in the file of this patent:

UNITED STATES PATENTS

| Number | Name | Date |
|---|---|---|
| 1,972,221 | Eulenhofer | Sept. 4, 1934 |
| 1,976,461 | Prince | Oct. 9, 1934 |
| 2,152,822 | Schlesinger | Apr. 4, 1939 |
| 2,499,996 | Kelsey | Mar. 7, 1950 |
| 2,505,316 | Wilmotte et al. | Apr. 25, 1950 |
| 2,526,509 | Shanahan | Oct. 17, 1950 |